US007175918B2

(12) United States Patent
Saraf et al.

(10) Patent No.: US 7,175,918 B2
(45) Date of Patent: Feb. 13, 2007

(54) POLYOLEFIN COMPOSITIONS

(75) Inventors: Anil W. Saraf, Mason, OH (US); Steven A. Schwartz, Downingtown, PA (US); Edward T. Shawl, Wallingford, PA (US); Michael Bridges, Cincinnati, OH (US); Venki Chandrashekar, Houston, TX (US)

(73) Assignees: Equistar Chemicals, LP, Houston, TX (US); Lyondell Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/832,752

(22) Filed: Apr. 27, 2004

(65) Prior Publication Data

US 2005/0239961 A1 Oct. 27, 2005

(51) Int. Cl.
*C08L 51/00* (2006.01)
(52) U.S. Cl. ............................ 428/500; 525/57; 525/69
(58) Field of Classification Search ................. 525/69, 525/57; 428/500
See application file for complete search history.

(56) References Cited

U.S. PATENT DOCUMENTS

| | | | | |
|---|---|---|---|---|
| 3,361,843 A | 1/1968 | Miller et al. | ................ | 260/857 |
| 3,395,198 A | 7/1968 | Taniguchi et al. | .......... | 260/897 |
| 3,653,803 A | 4/1972 | Hammer | ........... | 8/31.8 |
| 4,086,204 A | 4/1978 | Cassandrini et al. | ....... | 260/45.8 |
| 4,331,586 A | 5/1982 | Hardy | .......... | 525/186 |
| 4,442,057 A | 4/1984 | Brody | ........... | 264/176 |
| 4,442,266 A | 4/1984 | Brody | .......... | 525/173 |
| 4,518,744 A | 5/1985 | Brody | .......... | 525/184 |
| 4,542,199 A | 9/1985 | Kaminsky et al. | ......... | 526/160 |
| 4,543,390 A * | 9/1985 | Tanaka et al. | .......... | 525/63 |
| 4,732,786 A | 3/1988 | Patterson et al. | .......... | 427/261 |
| 4,812,500 A | 3/1989 | Hayden | ........ | 524/99 |
| 5,017,658 A | 5/1991 | Noma et al. | ................ | 525/195 |
| 5,330,831 A | 7/1994 | Knoerzer et al. | ........... | 428/353 |
| 5,496,635 A | 3/1996 | Francis et al. | .............. | 428/352 |
| 5,496,636 A | 3/1996 | Gu et al. | .................... | 428/352 |
| 5,539,124 A | 7/1996 | Etherton et al. | ........... | 548/402 |
| 5,565,522 A | 10/1996 | Bohringer et al. | .......... | 525/176 |
| 5,576,366 A | 11/1996 | Sheth | .......... | 524/140 |
| 5,614,574 A | 3/1997 | Sheth | ......... | 524/140 |
| 5,637,660 A | 6/1997 | Nagy et al. | ................. | 526/160 |
| 5,756,611 A | 5/1998 | Etherton et al. | ............ | 526/127 |
| 5,789,123 A | 8/1998 | Cleckner et al. | .............. | 430/18 |
| 5,827,627 A | 10/1998 | Cleckner et al. | .............. | 430/18 |
| 5,846,654 A | 12/1998 | Modrak | ..................... | 428/364 |
| 5,902,684 A | 5/1999 | Bullard et al. | ............. | 428/515 |
| 6,034,027 A | 3/2000 | Krishnamurti et al. | ...... | 502/200 |
| 6,034,208 A | 3/2000 | McDaniel et al. | ......... | 528/403 |
| 6,214,958 B1 | 4/2001 | Le-Khac et al. | ........ | 526/318.3 |
| 6,388,013 B1 | 5/2002 | Saraf et al. | ................. | 525/191 |
| 6,433,088 B1 | 8/2002 | Saraf | .......................... | 525/191 |
| 6,511,952 B1 | 1/2003 | Schwartz | ..................... | 510/361 |
| 6,527,850 B2 | 3/2003 | Schwartz et al. | ........... | 106/772 |
| 6,562,081 B2 | 5/2003 | Saraf et al. | ................... | 8/529 |
| 6,582,510 B1 * | 6/2003 | Schwartz | ..................... | 106/499 |
| 6,794,475 B1 * | 9/2004 | Bialke et al. | ............... | 526/320 |
| 6,815,499 B2 * | 11/2004 | Yasumura et al. | ............ | 525/69 |
| 2003/0019054 A1 | 1/2003 | Saraf et al. | .................... | 8/456 |
| 2003/0019401 A1 | 1/2003 | Schwartz et al. | .......... | 106/772 |

OTHER PUBLICATIONS

Lewis, Richard J., Sr. (2002). Hawley's Condensed Chemical Dictionary (14th Edition). John Wiley & Sons, entry for "substrate".*

H. Needles, *Textile Fibers, Dyes, Finishes, and Processes: A Concise Guide*, Noyes Publications, (1986) 191.

* cited by examiner

*Primary Examiner*—Jeffrey Mullis
(74) *Attorney, Agent, or Firm*—Brooks Kushman P.C.

(57) ABSTRACT

The present invention relates to polyolefin compositions that incorporate an acrylic/polyether comb-branched copolymer, articles made from the compositions, such as polyolefin films and polyolefin fibers, and methods for making the compositions and the articles.

23 Claims, No Drawings

POLYOLEFIN COMPOSITIONS

FIELD OF THE INVENTION

The present invention relates to polyolefin compositions containing an acrylic/polyether comb-branched copolymer, articles made from the compositions, such as polyolefin films and polyolefin fibers, and methods for making the same.

BACKGROUND ART

Polyolefins have long been used in the manufacture of many everyday products such as films and fibers. It is known to incorporate small amounts of additives into polyolefin compositions to improve processing, and in some instances, the resulting product's characteristics. The additives can sometimes include other polymers.

Polyolefin films are not easily printable. This limits their utility in areas where printable surfaces are desired. Methods to improve printability of polyolefin are known. These methods include flame treatment, plasma treatment, chemical treatment and corona discharge treatment. These treatments can soften or ionize the surface of polyolefins and make the surface temporarily printable.

U.S. Pat. No. 5,330,831 teaches how to modify a polypropylene substrate by corona discharge treatment and then cover the treated surface with a coating. The coating is a printable polymer and, therefore, the coated polypropylene is printable. Similarly, U.S. Pat. Nos. 5,789,123, 5,496,635, 5,496,636, 4,732,786, and 5,827,627 also teach polypropylene films that are coated with printable coatings.

Another method to make polypropylene substrates printable is to make multilayer films. For example, U.S. Pat. No. 5,902,684 teaches a printable multilayer film that consists of a polypropylene layer, a primer coating layer, a layer of crosslinked polyvinyl alcohol, and a layer of a blend of polyvinyl alcohol and an ethylene-acrylic acid copolymer. A printable outer layer makes the multilayer film printable. Polypropylene films with multilayers or coated with printable coatings, although printable, are difficult and expensive to make. Moreover, these modifications often impair the clarity of polypropylene films.

Sealability of polyolefin films is often desired. Sealing aids, such as EVA, are often used with polyolefin films to render them heat-sealable.

With regard to fibers, adding a small amount of a polymer capable of forming an anisotropic melt with a fiber-forming polymer in the temperature range at which fibers are spun is disclosed in U.S. Pat. Nos. 4,442,057 and 4,442,266. The additive polymers are liquid crystal polymers such as copolymers of 6-oxy-2-naphthoyl and p-oxybenzoyl moieties. Fiber-forming polymers to which the additive polymers can be added include polyesters, polyamides and polypropylene.

U.S. Pat. No. 4,518,744 discloses an improved melt spinning process and fibers obtained by the addition of 0.1 to 10 wt. % of a polymer that is immiscible in a melt of common fiber-forming polymers such as polyesters, copolyesters, polyamides, copolyamides and polyolefins. While the immiscible polymers can be from the same chemical family as the fiber-forming polymer, the immiscible polymer must have an extensional viscosity such that molten spheres of the additive polymer deform into microfibrils along the spinning threadline.

Imidated polyalkyl methacrylate is added to polyethylene terephthalate at a 0.1 to 5 wt. % level in U.S. Pat. No. 5,565,522 to improve spinning and reduce thread break.

The inability to dye polyolefin fibers is also well known and has been a long-standing problem within the industry. Polyolefins are hydrophobic and they lack dye sites to which dye molecules may become attached. One approach to color polyolefin fibers has been to add colored inorganic salts or stable organometallic pigments to polymer melts prior to spinning. Nonvolatile acids or bases or materials such as polyethylene oxides or metal salts have also been added to polymers prior to fiber formation to increase the affinity of the fiber for disperse, cationic, acid or mordant dyes. Still another approach has been to chemically graft polyolefin fibers with appropriate monomers after fiber formation to improve dyeability. See *Textile Fibers, Dyes, Finishes, and Processes: A Concise Guide*, by Howard L. Needles, Noyes Publications, 1986, page 191.

Efforts to impart dyeability to polyolefins, and particularly polypropylene, by incorporating nitrogen-based polymer additives have also been disclosed. In U.S. Pat. No. 3,361,843, various incompatible, basic nitrogen-based polymers are added to polypropylene, given a treatment with high concentrations of certain acidic chemical reagents and then dyed in an acid dye bath. According to U.S. Pat. No. 3,653,803, dyeing of the polypropylene fiber is somewhat improved by the method of U.S. Pat. No. 3,361,843, but processing of the fiber is difficult due to polymer incompatibility, the dye fastness properties not being reliably reproducible, and tinctorial strengths not being commercially sufficient. In U.S. Pat. Nos. 3,395,198 and 3,653,803, various compatible nitrogen-containing copolymers of ethylene and an aminoalkyl acrylate compound are disclosed. When blended with polyolefins, the copolymers render fibers formed from the blend acid dyeable. In U.S. Pat. No. 5,017,658, a fiber finishing agent is used in melt spinning dyeable polypropylene fibers obtained by blending a copolymer of an ethylene aminoalkyl acrylate with polypropylene.

Also due to their hydrophobic nature, polyolefin fibers have been found to be relatively non-wettable. This has proven to be an obstacle in their use as wipes since their hydrophobic nature tends to make the incorporation of water-based chemicals into the fibers difficult. This has also proven to be an obstacle for the use of polyolefin fiber in the manufacture of other products such as those used in filtration applications, and dyed and printed fabrics.

Accordingly, it would be advantageous to provide a polyolefin composition that could be used to manufacture common polyolefin products, such as polyolefin films and polyolefin fibers, that overcomes at least one deficiency associated with the prior art. More specifically, it would be desirable to provide a polyolefin composition that can also be used to manufacture printable polyolefin films with good heat seal properties. Also, it would be desirable to provide polyolefin compositions that can be used to manufacture fibers that are dyeable and wettable.

SUMMARY OF THE INVENTION

The present invention provides polyolefin compositions that can be used to manufacture printable polyolefin films having good heat seal properties as well as wettable and dyeable polyolefin fibers.

In at least one embodiment of the present invention, the polyolefin compositions comprise a polyolefin and an acrylic/polyether comb-branched copolymer. In at least one embodiment, the composition comprises 0.10 to 30 wt. % of an acrylic/polyether comb-branched polymer and 70 to 99.9 wt. % of a polyolefin.

In at least certain embodiments, the present invention comprises articles made from the polyolefin compositions of the present invention. In at least one embodiment, the present invention comprises a polyolefin film comprising a polyolefin and an acrylic/polyether comb-branched copolymer. In at least another embodiment, the present invention comprises a polyolefin fiber comprising a polyolefin and an acrylic/polyether comb-branched copolymer. In at least certain embodiments, the present invention comprises methods for forming the compositions and the articles.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; and the first definition of an acronym or other abbreviation applies to all subsequent uses herein of the same abbreviation and applies mutatis mutandis to normal grammatical variations of the initially defined abbreviation.

In at least one embodiment, the present invention provides a polyolefin composition suitable for forming a variety of polyolefin products, such as polyolefin films and fibers. In at least one embodiment of the present invention, the polyolefin composition comprises a polyolefin and an acrylic/polyether comb-branched copolymer. Preferably, the composition comprises 0.1 to 30 wt. % of an acrylic/polyether comb-branched polymer and 70 to 99.9 wt. % of a polyolefin, based on the total weight of the composition. More preferably, the polyolefin composition comprises 0.5 to 20 wt. % of an acrylic/polyether comb-branched copolymer and 80 to 99.5 wt. % of a polyolefin, based on the total weight of the composition. Even more preferably, the polyolefin composition comprises 1 to 10 wt. % of the copolymer and 90 to 99 wt. % of a polyolefin, based on the total weight of the composition. Most preferably, the polyolefin composition comprises 1.5 to 5 wt. % of the copolymer and 95 to 98.5 wt. % of a polyolefin, based on the total weight of the composition.

The acrylic/polyether comb-branched copolymer preferably has a number average molecular weight ($M_n$) of 400 to 500,000, more preferably 600 to 400,000, and most preferably 1,000 to 100,000. The copolymer preferably has a mole ratio of acrylic monomer units to polyether units of 1/99 to 99/1, more preferably from 1/1 to 20/1, and most preferably from 4/1 to 20/1.

Methods for preparing acrylic/polyether comb-branched copolymer are known. For example, U.S. Pat. Nos. 6,214,958, 6,511,952, 6,582,510 and U.S. Pat. Appl. Publ. No. US 2003/0019401, the teachings of which are incorporated herein by reference, teach how to prepare acrylic/polyether comb-branched copolymers useable with the present invention.

Suitable polyolefins include polyethylene, polypropylene, and mixtures thereof. As is well known by those of ordinary skill in the art, polyolefins can be produced with Ziegler catalysts or single-site catalysts. Single-site catalysts can be divided into metallocene and non-metallocene. Metallocene single-site catalysts are transition metal compounds that contain cyclopentadienyl (Cp) or Cp derivative ligands (see U.S. Pat. No. 4,542,199). Non-metallocene single-site catalysts are referred to as those that contain ligands other than Cp but have catalytic characteristics similar to those of metallocenes. The non-metallocene single-site catalysts often contain heteroatomic ligands, e.g., boraaryl (see U.S. Pat. No. 6,034,027), pyrrolyl (see U.S. Pat. No. 5,539,124), azaborolinyl (see U.S. Pat. No. 5,756,611) and quinolinyl (see U.S. Pat. No. 5,637,660). Single-site catalysts give polyolefins narrow molecular distributions.

Preferably, the number average molecular weight of the polyolefin is within the range of 10,000 to 500,000, and most preferably from 20,000 to 250,000. Polydispersity index (PDI), or molecular weight distribution (MWD), is the ratio of weight average molecular weight over number average molecular weight. Molecular weight and PDI can be measured by gel permeation chromatography (GPC). Preferred polyolefins have a PDI within the range of 2 to 10, and more preferably from 2 to 8, as measured by GPC.

Polyethylene resins useful for the present invention, in at least one embodiment, include homopolymers of ethylene and copolymers of ethylene with other olefinic hydrocarbon monomers such as propylene, 1-butene, 1-hexene, 4-methylpentene-1 and diolefins (e.g., 1,3-butadiene, 1,4-hexadiene, 1,5-hexadiene). It should be understood that when polyethylene copolymers are present, the polyethylene copolymer resins will have ethylene as the major constituent. It should also be understood that as used herein, the term polyethylene refers to both homopolymers and copolymers of ethylene.

As used herein, "melt flow rate" (MFR) means the value determined in accordance with ASTM D-1238 or ASTM D-1248 and reported in terms of grams per 10 minutes. For polyethylene, ethylene copolymers, and their blends, MFR is determined at 190° C. with a 2.16 kg load. For polypropylene, propylene copolymers, and their blends, MFR is determined at 230° C. with a 2.16 kg load.

In at least one embodiment, when polyethylene is present in the polyolefin composition, polyethylene homopolymers and copolymers of ethylene with $C_3$ to $C_8$ α-olefins are most advantageously employed. These resins have a high degree of linearity and will preferably have MFRs from 0.05 to 50 g/10 min and more preferably from 0.1 to 30 g/10 min. In certain embodiments, the MFR of the polyethylene resin used will depend on the type of operation used to produce the resulting polyolefin product, the type of resulting polyolefin product being produced and the resulting polyolefin product properties desired.

In at least one embodiment, densities of the polyethylene resins can range from 0.880 to 0.965 g/cm$^3$. This range of densities typically encompasses what are referred to as low density, medium density and high density resins. In certain embodiments, high density polyethylene (HDPE), medium density polyethylene (MDPE), linear low density polyethylene (LLDPE) and low density (LDPE) resins typically having densities from 0.941 to 0.965 g/cm$^3$, 0.926 to 0.940 g/cm$^3$, 0.916 to 0.925 g/cm$^3$, and 0.890 to 0.915 g/cm$^3$, respectively, are particularly advantageous. In certain other embodiments, polyethylene homopolymers of moderate molecular weight distribution having densities from 0.940 to 0.962 g/cm$^3$ are especially useful. Densities are conveniently determined in accordance with ASTM D 1505.

The polyolefin composition can also contain polypropylene, either in place of, or in combination with, polyethylene.

Suitable polypropylene includes propylene homopolymers and random copolymers with ethylene or other α-olefins. Propylene homopolymers can be isotactic, syndiotactic, or atactic, or mixtures thereof. In at least one embodiment, isotactic polypropylene is preferred because of its crystalline nature.

Suitable random polypropylene copolymers include propylene-ethylene copolymers and propylene-$C_4$ to $C_{10}$ α-olefin copolymers. Examples of $C_4$ to $C_{10}$ α-olefins include 1-butene, 1-hexene and 1-octene. Compared to propylene homopolymers, random copolymers tend to exhibit increased clarity and improved impact resistance. In at least one embodiment, preferred random copolymers include propylene-ethylene copolymers. Preferably, the propylene-ethylene copolymers contain 1 to 20 wt. % recurring units of ethylene. More preferably, the propylene-ethylene copolymers contain 1 to 10 wt. % recurring units of ethylene.

Suitable polypropylenes for use with the invention preferably have MFRs within the range of 0.1 to 100 g/10 min., more preferably from 0.5 to 70 g/10 min., and most preferably from 1 to 40 g/10 min.

Optionally, the polyolefin composition may contain a third polymer as a blend. Adding a third polymer into the polyolefin composition can either enhance at least one performance characteristic of the composition and/or product and/or reduce cost. Suitable third polymers include polyester, acrylic resin, polyvinyl alcohol, polyvinyl chloride, polyvinyl acetate, polyvinyl ether, ethylene-vinyl acetate copolymers (EVA), ethylene-vinyl alcohol copolymers (EVOH), ethylene-acrylic acid copolymers, and the like, and mixtures thereof. In certain embodiments, EVA and EVOH are preferred, at least in part due to their ease of blending.

Optionally, the polyolefin composition contains antioxidants, UV-absorbents, flow agents, and/or other additives. Suitable additives are well known in the art. For example, U.S. Pat. Nos. 4,086,204, 4,331,586 and 4,812,500, the teachings of which are incorporated herein by reference, teach the UV stabilizers for polyolefins.

In at least one embodiment, the polyolefin composition of the present invention can be used to make printable and heat-sealable polyolefin films, and, more preferably, printable and heat-sealable polyethylene containing films.

The polyolefin films of the invention are rendered printable by uniformly blending a polyolefin with the acrylic/polyether comb-branched copolymer. Any suitable blending technique can be used. The polymers can be blended in solution, or in thermal processing such as extrusion. Polypropylene and blends thereof suitable for manufacturing polyolefin films in accordance with the present invention preferably have MFRs less than 12 g/10 min, more preferably from 0.1 to 10 g/10 min, and most preferably from 1 to 7 g/10 min. Polyethylene and blends thereof suitable for manufacturing polyolefin films in accordance with the present invention preferably have MFRs of less than 12 g/10 min, more preferably from 0.01 to 10 g/10 min, even more preferably from 0.02 to 6 g/10 min, and most preferably from 0.05 to 2 g/10 min.

The polyolefin films of the invention can be prepared from the polymer polyolefin composition by any suitable process, such as casting, blown film extrusion, and many other suitable techniques. Blown film extrusion is one preferred technique for a large commercial production.

Polyolefin films made in accordance with the invention are printable and heat sealable. By "printable," we mean that the film is relatively printable without any surface treatment, although surface treatments, e.g., flame treatment, plasma treatment, chemical treatment and corona discharge treatment, may be employed to increase its performance. By "heat sealable," we mean that the film may be sealable onto itself under the application of heat without the aid of an adhesive layer, such as an EVA (ethylene vinyl acetate) layer.

The film has an excellent adhesion with commonly used printing inks. One advantage of the polyolefin film of the invention is that it is printable with most commercial inks that have a minimum amount of VOC (volatile organic compound) solvents.

Films made in accordance with the present invention may have a thickness of 0.05 to 12 mils, more preferably 0.1 to 4 mils, and most preferably 0.4 to 1.0 mils. The printed film has many applications. For example, it can be used for labels, documents, and advertisements. The film is also useful as labels for clear bottles, boxes, or other packages where goods inside the packages can be clearly seen without opening the packages. The film is also useful for plastic bags, trash bags, heavy duty sacks, cereal box liners, as well as other items.

Films made in accordance with the invention are also heat-sealable. Heat seal strength is a measure of heat-sealability. Heat seal strength is measured by ASTM D 882/F88. Films made in accordance with the present invention have relatively good heat seal strength and relatively low seal temperatures.

In at least another embodiment, the polyolefin compositions of the present invention are used to manufacture polyolefin fibers. The polyolefin fibers made from the polyolefin blends of the present invention can be used for various applications. In certain embodiments, the polyolefin fibers can be used for fine denier fibers for apparel, fine denier fibers for active wear, BCF (bulk continuous filament) applications for carpets and rugs, slit-tape for printable wall coverings, and other similar applications. For these types of applications, the fibers may have a denier per filament ranging between 0.5 and 25 dpf. Polypropylene and blends thereof suitable for manufacturing fibers preferably have deniers in this range and have MFRs of less than 45 g/10 min, more preferably from 3 to 40 g/10 min, and most preferably from 18 to 35 g/10 min. Polyethylene and blends thereof suitable for manufacturing fibers preferably have deniers in this range and have MFRs of less than 35 g/10 min, more preferably from 10 to 32 g/10 min, and most preferably from 12 to 30 g/10 min.

In another embodiment, the polyolefin composition can be used to make polyolefin fibers that are used for melt blown, spun-bonded and staple non-wovens for filtration, wipes, and hygiene applications, and other applications. For these types of applications, the fibers may have a denier per filament ranging between 0.1 to 6 dpf. Polypropylene and blends thereof suitable for manufacturing polyolefin fibers preferably have deniers in this range and have MFRs less than 1,000 g/10 min, and most preferably from 12 to 800 g/10 min. Polyethylene and blends thereof suitable for manufacturing polyolefin fibers preferably have deniers in this range and have MFRs of less than 60 g/10 min, more preferably from 10 to 50 g/10 min, even more preferably from 12 to 40 g/10 min, and most preferably from 18 to 35 g/10 min.

The polyolefin composition of the present invention yields polyolefin fibers that are relatively dyeable and wettable. Dyeability is measured by visual inspecting, as is understood by one of ordinary skill in the art. The relative hydrophilicity of a resin can be inferred from the measured contact angle of a substrate made from the resin. Substrates made in accordance with the composition of the present invention preferably have a contact angle of below 90 degrees, more preferably from 75 to 88 degrees, and most preferably from 80 to 85 degrees, as measured by ASTM D5946.

Any suitable process for making polyolefin fibers from the polyolefin composition of the present invention can be used. One suitable conventional process of fiber formation from a melt involves extrusion of the polyolefin composition in the melt state from a spinnerette followed by drawing in a one step operation or in a second step. In accordance with known procedures, conventional stabilizers to protect the resin against thermal degradation during the melt-spinning operation may be included in the polyolefin composition. Conventional nucleating agents may also be included in the resin and, depending on the end use application, one or more stabilizers to protect the resulting fiber against oxidative and ultraviolet degradation may be present. These additives will generally be present in amounts not exceeding 2 wt. % and, more typically, in amounts from 0.01 to 0.5 wt. %. All weight percentages specified herein are based on the total weight of the polyolefin composition unless otherwise specified.

Fibers of the invention can be melt-spun using conventional procedures described in the art. In general, the melt-spinning operation can be carried out at temperatures as high as 290° C. and, more preferably, from 170° C. to 250° C. Temperatures much above these limits have little advantage and, in fact, can be detrimental due to excessive degradation of the polymer. As is recognized by those skilled in the art, processing temperature and pressure as well as the size and shape of the spinnerette holes, spinning speed and draw ratio are selected to minimize melt fracture and optimize fiber properties. A detailed description of procedures used to melt-spin fibers is provided in U.S. Pat. No. 5,846,654, which is incorporated herein by reference. Other fiber forming techniques described in U.S. Pat. No. 5,614,574, which is incorporated herein by reference, can be employed with the composition of the present invention.

While the fibers of the invention are useful for a variety of applications as will be apparent to those skilled in the art, their improved dyeability and wettability and general properties render them primarily useful for rugs, wipes, medical applications, filtration, cleaning wipes, apparel active wear, sewing threads, automotive airbags, seatbelts, industrial high tenacity belts, cords, marine ropes, reinforced film for building construction, fiber reinforced composites and other high impact protective applications.

The present invention may be further appreciated by consideration of the following, non-limiting examples, and certain benefits of the present invention may be further appreciated by the examples set forth below.

EXAMPLE 1

A polyether macromonomer that is an acrylate of oxyethylene/oxypropylene random copolymer having oxyethylene/oxypropylene ratio 70/30 by weight and Mn of 3,000 (122.5 g, 0.0408 mol) that is made in accordance with the process described in U.S. Pat. No. 6,034,208, acrylic acid (17.6 g, 0.245 mol), mercaptopropionic acid (1.2 g) and ammonium persulfate (0.70 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 minutes. Additional polyether macromonomer (245 g, 0.0817 mol), made in the same manner described above, acrylic acid (35.4 g, 0.492 mol), mercaptopropionic acid (2.6 g) and deionized water (DI water) (145 g) are then mixed. The mixture is purged with $N_2$ for 20 minutes and then charged into the monomer pump. Ammonium persulfate (1.4 g) is dissolved in DI water (153 g). The solution is purged with $N_2$ for 20 minutes and then charged into the initiator pump. The reactor contents are heated to 40° C. The monomer mixture and the initiator solution are continuously pumped into the reactor at the rates of 1.0 g/min and 0.33 g/min, respectively. The product is continuously withdrawn from the reactor rate of 1.33 g/min. It has $M_n$: 45,000 and $M_w/M_n$: 1.42.

EXAMPLE 2

Polyolefinic compositions of the present invention are made and compared to prior art compositions not having the comb-branched copolymer. The polyolefinic compositions are cast into a thin film of 10 mils thickness. The films made in accordance with the present invention are printable. The films undergo testing to determine their relative contact angle, coefficients of friction, seal strength and fusion temperatures. The contact angle test is performed in accordance with ASTM D5946. The lower the contact angle of a film, the more readily printable it will be. The coefficient of friction test is performed in accordance with ASTM D1894. The seal strength is performed in accordance with the ASTM D882/F88. The fusion temperature is the minimum temperature of the heating apparatus used to heat seal the film against itself.

The compositions of the films and the results of the tests are shown below in Table 1.

EXAMPLE 3

Polyolefinic compositions made in accordance with the present invention are formed into fibers and tested for dyeability with dispersed dye. The fibers exhibited good dye depth.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

TABLE 1

| COMPOSITION | CONTACT ANGLE (°) | COEFFICIENT OF FRICTION | | SEAL STRENGTH (LBS.) | FUSION TEMPERATURE (° F.) |
|---|---|---|---|---|---|
| | | STATIC | KINETIC | | |
| HDPE M6060[1] | 93 | 0.26 | 0.23 | 0 | No Seal |
| M6060 + 5% Comb | 85 | 0.16 | 0.16 | 11.7 | 400 |
| M6060 + 10% Comb | 87 | 0.19 | 0.18 | 18.2 | 375 |
| LLDPE GA502020[2] | 93 | 0.15 | 0.11 | 13.9 | 325 |
| GA50202 + 5% Comb | 85 | 0.14 | 0.15 | 13.3 | 310 |
| GA50202 + 10% Comb | 86 | 0.18 | 0.17 | 11.8 | 310 |
| PP 31U18A[3] | 94 | 0.38 | 0.33 | 0 | No Seal |
| 31U18A + 10% Comb | 79 | 0.25 | 0.18 | 6.4 | 400 |

[1]HDPE M6060 is a high density polyethylene available from Equistar Chemicals, LP.
[2]LLDPE GA502020 is linear low density polyethylene available from Equistar Chemicals, LP.
[3]PP 31U18A is a polypropylene available from Sunoco.

We claim:

1. An article comprising a fiber or film substrate comprised of a blend of polyolefin and an acrylic/polyether comb-branched copolymer, wherein the polyolefin is present in an amount of at least 70 wt. %, based on the total weight of the composition in the substrate.

2. The article of claim 1, wherein the blend comprises 70 to 99.9 wt. % of the polyolefin and 0.1 to 30 wt. % of the comb-branched copolymer, based on the total weight of the blend.

3. The article of claim 1, wherein the blend comprises 95 to 98.5 wt. % of the polyolefin and 1.5 to 5 wt. % of the comb-branched copolymer, based on the total weight of the blend.

4. The article of claim 1, wherein the copolymer is a polyether acrylate of oxyethylene/oxypropylene random copolymer having an oxyethylene/oxypropylene ratio of 70/30 by weight.

5. The article of claim 1, wherein the substrate is an extruded fiber.

6. The article of claim 5, wherein the fiber is a melt spun extruded fiber.

7. The article of claim 5, wherein the fiber has a denier of 0.1 to 6 dpf.

8. The article of claim 1, wherein the polyolefin comprises polyethylene resin.

9. The article of claim 1, wherein the substrate is included in a non-woven.

10. The article of claim 9, wherein the non-woven is included in a filter.

11. The article of claim 5, wherein the fiber is included in a bulk continuous filament application.

12. The article of claim 1, wherein the substrate is a printable film.

13. The article of claim 1, wherein the film has a thickness of 0.05–12 mils.

14. The article of claim 1, wherein the film is a blown film extrusion.

15. The article of claim 1, wherein the film has a heat seal strength greater than 6.4 lbs. when measured by ASTM D882/F88.

16. The article of claim 1, wherein the blend further comprises a third polymer.

17. The article of claim 16, wherein the third polymer is selected from a group consisting of EVOH and EVA.

18. An extruded fiber or film article comprising an extruded polyolefin product comprised of a blend of a polyolefin and an acrylic/polyether comb-branched copolymer, wherein the polyolefin is present in an amount of at least 70 wt. %, based on the total weight of the polyolefin product and the acrylic/polyether comb-branched copolymer is present in an amount of 0.1 to 30 wt. %, based on the total weight of the polyolefin product.

19. The extruded article of claim 18, wherein the extruded polyolefin product is an extruded fiber having a denier of 0.5–25 dpf.

20. The extruded article of claim 18, wherein the extruded polyolefin product is an extruded film having a thickness of 0.05–12 mils.

21. A method of making an extruded film or fiber article, said method comprising mixing a polyolefin with an acrylic/polyether comb-branched copolymer to form a blend and extruding the blend into a film or fiber article, wherein the blend comprises 70 to 99.9 wt. % of the polyolefin and 0.1 to 30 wt. % of the comb-branched copolymer, based on the total weight of the blend.

22. An article comprising a substrate comprised of a blend of polyolefin and an acrylic/polyether comb-branched copolymer, wherein the polyolefin is present in an amount of at least 70 wt. %, based on the total weight of the composition in the substrate, and wherein the substrate has a thickness of no more than 12 mils.

23. The article of claim 22, wherein the substrate has a thickness of 0.05–12 mils.

* * * * *